(12) United States Patent
Omo et al.

(10) Patent No.: US 7,143,567 B2
(45) Date of Patent: Dec. 5, 2006

(54) UNIT FOR PACKAGING AND PALLETIZING ROLLS OF TOILET PAPER AND/OR KITCHEN TOWEL

(75) Inventors: Davide Dall Omo, Bologna (IT); Gilberto Poli, Castello di Serravalle (IT); Gianfranco Loperfido, Lugo (IT); Christian Zagnoni, Calcara di Crespellano (IT); Emanuele Gatteschi, Parma (IT)

(73) Assignees: OCME S.R.L., Parma (IT); T.M.C. Tissue Machinery Company, Granarolo Dell'Emilia (IT)

( * ) Notice: Subject to any disclaimer, the term of this patent is extended or adjusted under 35 U.S.C. 154(b) by 79 days.

(21) Appl. No.: 11/019,954

(22) Filed: Dec. 22, 2004

(65) Prior Publication Data

US 2005/0166552 A1 Aug. 4, 2005

(30) Foreign Application Priority Data

Dec. 23, 2003 (IT) .......................... MI2003A2587

(51) Int. Cl.
*B65B 35/56* (2006.01)
*B65B 35/52* (2006.01)
*B65B 35/30* (2006.01)

(52) U.S. Cl. ............................ 53/443; 53/441; 53/531; 53/537; 53/541; 53/544; 53/147; 414/788.4; 414/789.2; 414/791.1

(58) Field of Classification Search .................. 53/433, 53/531, 537, 541, 147, 171, 544, 441, 446, 53/443; 414/416.02, 416.05, 416.06, 788.4, 414/789.2, 791.1, 792.9
See application file for complete search history.

(56) References Cited

U.S. PATENT DOCUMENTS

| 3,895,476 | A | * | 7/1975 | Burns, III ..................... 53/442 |
| 4,000,820 | A | * | 1/1977 | Kurk et al. .............. 414/791.8 |
| 4,018,031 | A | | 4/1977 | Smaw |
| 4,293,272 | A | * | 10/1981 | Jellema ................... 414/744.5 |
| 4,439,084 | A | * | 3/1984 | Werkheiser ................. 414/792 |
| 4,679,379 | A | * | 7/1987 | Cassoli ........................ 53/438 |
| 4,901,504 | A | * | 2/1990 | Tsuji et al. ................... 53/247 |
| 4,951,445 | A | * | 8/1990 | Thibault ...................... 53/167 |

(Continued)

FOREIGN PATENT DOCUMENTS

DE 39 06 922 10/1989

(Continued)

OTHER PUBLICATIONS

EPO Search Report.

*Primary Examiner*—Scott A. Smith
*Assistant Examiner*—Gloria R. Weeks
(74) *Attorney, Agent, or Firm*—Hedman & Costigan PC; James V. Costigan

(57) ABSTRACT

Unit for packaging and palletizing rolls of paper comprising a bagging and/or forming machine adapted to sort packages of said rolls into batches or to bag said sorted loose packages in a plastic bag, and a palletizing station comprising at lease one manipulator provided with grippers to handle loose packages of delivered products from said bagging and/or forming machine. The products are conveyed to said palletizing station with a predetermined stepped sequence and spaced from one another in at least one row on a conveyer element, wherein said at least one robot and said bagging and/or forming machine are interconnected and are programmed respectively to sort said products in batches of different forms and dimensions according to a sequence which is continuously variable to form a layer of a pallet with different batches of products adjacent to and engaged with one another.

4 Claims, 2 Drawing Sheets

U.S. PATENT DOCUMENTS

| | | | |
|---|---|---|---|
| 4,995,224 A * | 2/1991 | Yourgalite et al. | 53/540 |
| 5,267,590 A * | 12/1993 | Pringle | 141/1 |
| 5,348,440 A * | 9/1994 | Focke | 414/792.9 |
| 5,372,473 A * | 12/1994 | Moyden et al. | 414/788.4 |
| 5,433,063 A * | 7/1995 | Kovacs et al. | 53/550 |
| 5,501,571 A * | 3/1996 | Van Durrett et al. | 414/801 |
| 5,553,442 A * | 9/1996 | Fadaie | 53/445 |
| 5,607,278 A * | 3/1997 | Mojden et al. | 414/416.07 |
| 5,640,832 A * | 6/1997 | Black, Jr. | 53/442 |
| 5,873,214 A * | 2/1999 | Moore et al. | 53/399 |
| 6,505,093 B1 * | 1/2003 | Thatcher et al. | 700/216 |
| 6,688,839 B1 * | 2/2004 | Hirschek et al. | 414/799 |
| 6,715,265 B1 * | 4/2004 | Franzaroli | 53/435 |
| 6,742,459 B1 * | 6/2004 | Lucas | 108/55.1 |
| 6,871,116 B1 * | 3/2005 | Brust et al. | 700/245 |

FOREIGN PATENT DOCUMENTS

| | | |
|---|---|---|
| EP | 1 127 791 | 8/2001 |
| EP | 1 306 308 | 5/2003 |

* cited by examiner

UNIT FOR PACKAGING AND PALLETIZING ROLLS OF TOILET PAPER AND/OR KITCHEN TOWEL

The present invention relates to a unit and to a method for packaging and palletizing rolls of toilet paper and/or kitchen towel.

Rolls of toilet paper and/or kitchen towel, packaged according to various configurations, are called loose packages and in particular cases or packs depending on the different arrangement of the rolls in several layers or rows. A plurality of loose packages can then be packaged in a bagging machine according to various configurations forming a so-called bag.

In fact, the use of bagging machines to associate the rolls of paper, already packaged in multiple units (loose packages) in a single package called bag, is already known.

In so-called robotized palletizing stations or areas, one or two manipulators provided with grippers are used to form pallets which can be composed of superimposed layers comprising a plurality of bags or comprising a plurality of packages of multiple units.

In a packaging line for rolls of toilet paper and/or kitchen towels, according to specific needs pallets comprising layers or bags or loose packages can be composed on each occasion in the same palletizing area.

The line is composed of a bagging machine, fed with the loose packages, which provides bags of the previously chosen format, and a conveyor belt, or feeding line dedicated to the loose packages, which can also be loaded manually.

To manage the flow of bags or loose packages arriving from the two feed lines, an additional device, or sorting station, must be provided for this purpose upstream of the palletizing area, to divide the multiple units of rolls or the bags into several rows and orient them in order to form partial collections ready to be subsequently picked up by the robot positioned to form a complete layer of pallets.

From the description, this technical solution seems bulky as it requires the presence of several dedicated conveyor belts and a specific orientation device. Moreover, this solution is consequently costly both from the viewpoint of costs to supply the individual machines and running costs.

The object of the present invention is to produce a compact unit for packaging and palletizing rolls of toilet paper and/or kitchen towels composed of a small number of devices.

Another object of the present invention is to produce a unit which produces layers of pallets with high stability.

A further object is to produce a unit which packages both loose packages and bags and wherein the operating mode can be changed very quickly.

Yet another object of the present invention is to produce a simple and functional unit and a method for packaging and palletizing rolls of toilet paper and/or kitchen towels with moderate costs.

These objects according to the present invention are achieved by producing a unit and method for packaging and palletizing rolls of toilet paper and/or kitchen towels as set forth in the independent claims.

Further characteristics of the unit and of the method are provided in the dependent claims.

The characteristics and advantages of a unit and a method for packaging and palletizing rolls of toilet paper and/or kitchen towels according to the present invention shall become more apparent from the following exemplary and non-limiting description with reference to the appended schematic drawings, wherein.

With reference to the figures, a unit for packaging and palletizing rolls of toilet paper and/or kitchen towels is shown, indicated as a whole with 10 and comprising a bagging and/or forming machine 20 and a palletizing station 30 positioned in series with each other and connected by means of a conveyor element 21, such as a conveyor belt, to form a single production unit.

Figure 2:
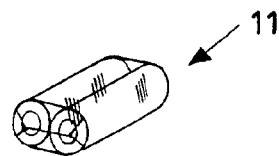
FIG. 2 shows an example of a loose package comprising two rolls of kitchen towel.

Packages of multiple units of rolls, or loose packages 11, are fed to the bagging and/or forming machine 20, shown purely as an example in FIG. 2, where two rolls of kitchen towel packaged side by side are shown. By carrying out a specific work programme for each type of pallet to be produced, the bagging machine 20 sorts the loose packages 11 according to batches 12 of products, wherein the batches have continuously variable forms and dimensions.

Figure 5:
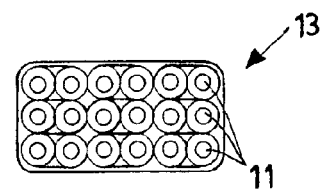
FIG. 5 shows an example of a batch of products wrapped in a bag.
Figure 3:
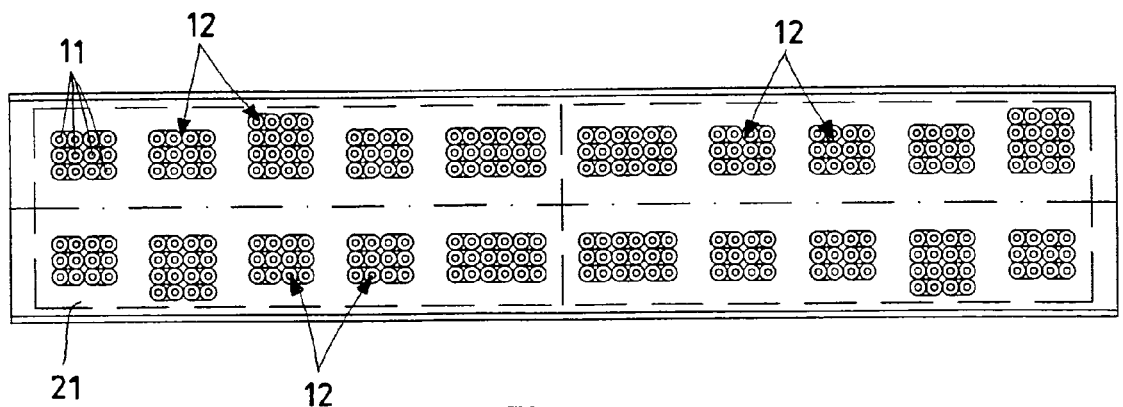
FIG. 3 shows an example of a sequence of batches delivered from the bagging and/or forming machine, wherein the batches differ from one another and are composed of a variable number of loose packages in FIG. 2.

The bagging machine 20 can optionally unload the batches 12 of sorted loose packages as shown in FIG. 3 onto the conveyor belt 21, or can form a so-called bag 13, shown schematically by way of an example in FIG. 5, by wrapping the batch of sorted loose packages in a plastic containment film 14 and then unloading said bag 13, which forms a batch 12 of bagged product, onto the conveyor belt 21.

The bagging and/or forming machine 20 supplies the batches 12 to the station downstream in one or more rows, with a predetermined stepped sequence and spaced from one another to be handled in the palletizing station 30.

In fact, this station 30 comprises at least one robot or manipulator 31 provided with grippers to handle the batches 12 of products, both when they are composed of a plurality of loose packages and when they are constituted by a bag 13.

Figure 1:
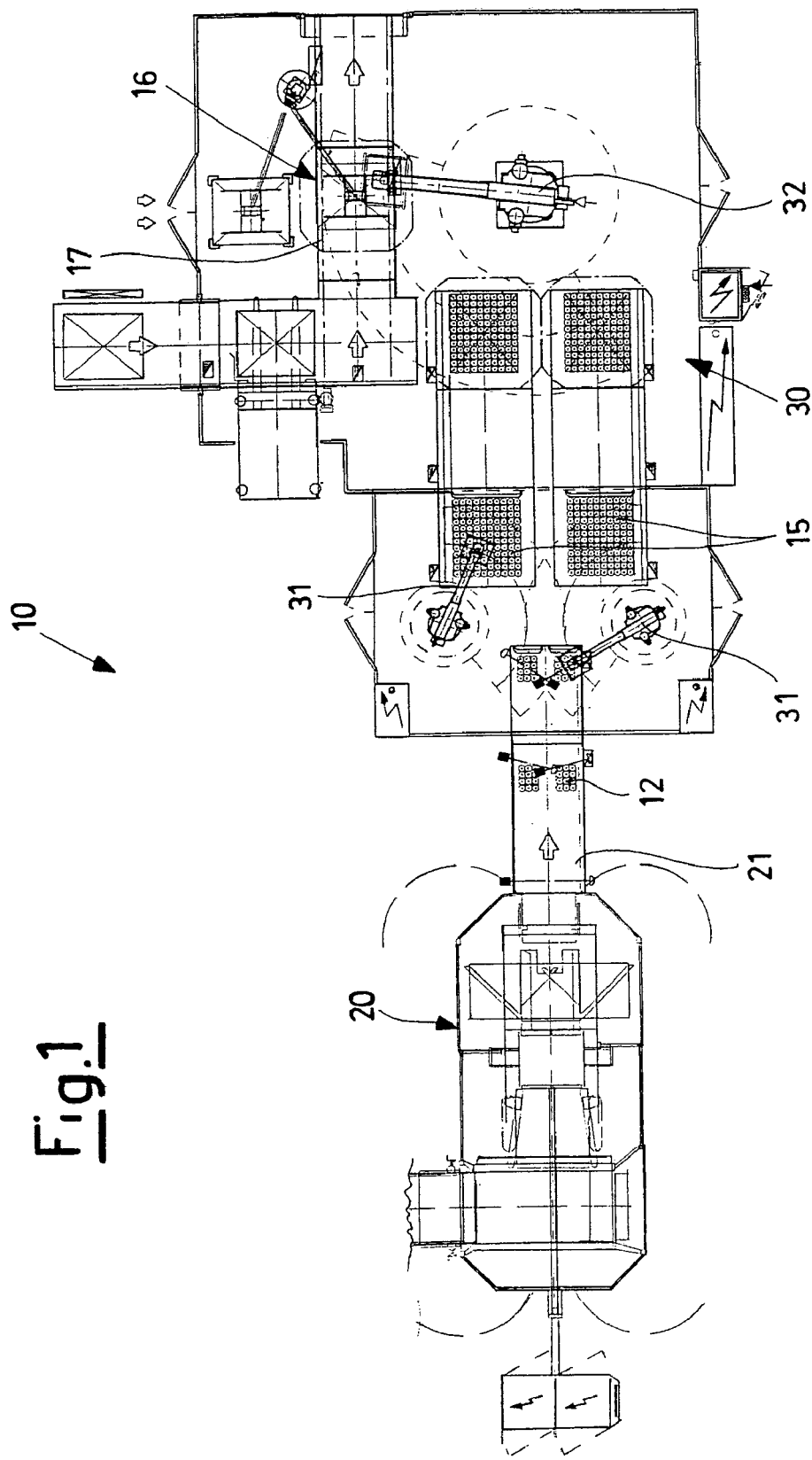
FIG. 1 shows a schematic plan view of a unit for packaging and palletizing rolls of toilet paper and/or kitchen towels according to the present invention.

In the unit 10, shown schematically in FIG. 1, the bagging machine 20 supplies, for example, two rows of batches of products 12 to the same number of robots 31, each suitable to grip, orient and position the batches 12 of products, whether loose packages 11 or bagged 13, to form a layer 15 of the pallet.

The robots 31 and the bagging and/or forming machine 20 constitute a single unit operating in one block, as they are electronically interconnected with each other and are programmed to sort and optionally to bag, and to handle the batches 12 of products, loose packages or bags, of different form and dimensions according to a continuously variable sequence in a predetermined and programmable way.

In fact, the sorted batches 12 delivered from the bagging machine 20 can be composed of a different and programmed number of loose packages 11 which, appropriately handled by the robot 31 downstream, can be disposed adjacent to and engaged with one another, to occupy the entire surface of each layer 15 and give stability to the pallet 16 composed of superimposed layers.

Figure 4:
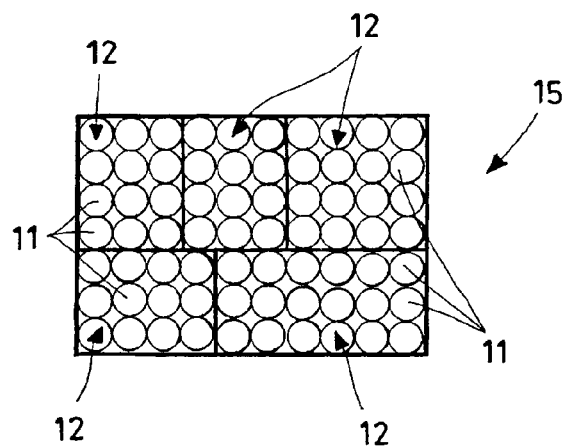
FIG. 4 shows a schematic plan view of an example of a layer of pallets composed with one of the two rows of batches in FIG. 3.

FIG. 3 shows an example in a plan view of a sequence of batches 12 delivered from the bagging and/or forming machine 20, wherein the batches are composed of a variable number of loose packages 11 of the type shown in FIG. 2, and wherein the batches 12 of each box marked with dashed lines are used to form a layer 15 as shown in FIG. 4.

The layers 15 formed by the pair of robots 31 are picked up by a further robot 32, positioned downstream as shown schematically in FIG. 1, which stacks them on a pallet base 17 or on the other layers 15 previously formed to form a complete pallet 16.

Each layer 15 consists of a certain number of batches of products, loose packages or bags, of different forms and dimensions, which are disposed engaged with one another as shown for example in FIG. 4 in order to cover the entire surface of the layer of pallets. Compared with a layer composed of adjacent batches the same as one another, the layer produced with the unit and method according to the present invention offers greater stability to the completed pallet.

In the preferred embodiment of the unit for packaging and palletizing rolls of toilet paper and/or kitchen towel 10, disclosed in the present invention, in which the bagging and/or forming machine supplies two rows of sorted batches to two gripping robots 31, in the case of a fault or production requirements the unit can also operate when fed with only one row of batches.

In particular, the unit for packaging and palletizing rolls of toilet paper and/or kitchen towel 10, disclosed in the present invention, provides a method for packaging and palletizing rolls of toilet paper and/or kitchen towel characterized by the steps of feeding the rolls of toilet paper and/or kitchen towel packaged in multiple units, or loose packages 11, to the bagging and/or forming machine 20 and sorting the loose packages 11 in said machine into batches 12 of products with continuously variable forms and dimensions according to a predetermined and programmable sequence.

The loose packages sorted into batches in the bagging and/or sorting machine can be subjected to a further packaging step consisting in wrapping them in a bag 13, or else they can be unloaded directly on the conveyor belt 21.

This is followed by the step of feeding the sorted batches 12 towards the palletizing station 30 using the conveyor element 21 on which they are disposed along at least one row, with a predetermined stepped sequence and spaced from one another, as well as the step to pick up the batches 12 of product by means of one or more robots or manipulators 31 to form the layer 15 of batches, adjacent to and engaged with one another.

Finally, the layer 15 of batches of products is picked up by the further manipulator 32 and stacked on the pallet base 17 or on other layers 15 formed previously to form the complete pallet 16.

The unit for packaging and palletizing rolls of toilet paper and/or kitchen towel has the advantage of reducing the number of the conveyor elements for connection between the individual machines, resulting in a more compact final part of the production line.

Moreover, besides reducing the costs, the unit according to the present invention also has the advantage of reducing the noise of the production line as well as the number of personnel required.

Furthermore, with the method for packaging and palletizing rolls of toilet paper and/or kitchen towel according to the present invention, complete pallets with high stability are advantageously produced.

The invention claimed is:

1. Unit for packaging and palletizing rolls of toilet paper and/or kitchen towel characterized in that it comprises a bagging and/or forming machine (20), suitable to sort several packages containing a plurality of rolls, called loose packages (11), into batches (12), and optionally to bag said sorted loose packages (11) in a bag (13) made of a plastic material, and a palletizing station or area (30) comprising at least one robot or manipulator (31) provided with grippers to handle batches (12) of sorted products composed of loose packages (11) or of a bag (13), wherein said batches (12) delivered from said bagging and/or forming machine (20) are conveyed to said palletizing station (30) with a predetermined stepped sequence and spaced from one another in at least one row on a conveyer element (21), wherein said at least one robot (31) and said bagging and/or forming machine (20) are electronically interconnected and are programmed respectively to sort and handle said products in batches (12), loose packages (11) or bags (13), of different forms and dimensions according to a sequence, continuously variable in a predetermined and programmable way, to form a layer (is) of a pallet (16) with different batches (12) of products adjacent to and engaged with one another which also comprises downstream of the at least one robot (31) to pick up the batches (12) of products, a further picking-up robot (32) which picks up said layer (15) and stacks it on a pallet base (17) or on other layers (15) to form a pallet (16).

2. Unit as claimed in claim 1, characterized in that said batches (12), loose packages (11) or bags (13), delivered from said bagging machine (20) are conveyed to said palletizing station (30) along two spaced rows, said palletizing station (30) comprising two robots (31), each suitable to pick up the batches (120 of products from one row.

3. Method for packaging and palletizing rolls of toilet paper and/or kitchen towel characterized in that it comprises the steps of feeding said rolls of toilet paper and/or kitchen towel packaged in multiple units, called loose packages (11), to a bagging and/or sorting machine (20), sorting said loose packages (11) into batches (12) or products with continuously variable forms and dimensions according to a predetermined and programmable sequence, feeding said batches (12) with a stepped sequence on a conveyor element (21) in at least one row to a palletizing station (30), picking up said batches (12) of products using a robot or manipulator (31) and forming a layer (15) of batches, adjacent to and engaged with one another wherein said layer (15) of batches of products is picked un by a further manipulator (32) and stacked on a pallet base (17) or on other layers (15) to form a pallet (16).

4. Method as claimed in claim 3, characterized in that in said bagging machine (20) said loose packages (11) sorted into batches of products are packaged in a bag (13).

* * * * *